United States Patent [19]
Solanki et al.

[11] Patent Number: 5,164,247
[45] Date of Patent: Nov. 17, 1992

[54] WEAR RESISTANCE IN A HARDFACED SUBSTRATE

[75] Inventors: Mukesh M. Solanki; Christopher Harley, both of New Albany, Ind.

[73] Assignee: The Pullman Company, Del.

[21] Appl. No.: 475,745

[22] Filed: Feb. 6, 1990

[51] Int. Cl.$^5$ .................... B32B 7/02; B32B 15/08
[52] U.S. Cl. .................... 428/213; 428/220; 428/422; 428/463; 428/698
[58] Field of Search .......... 428/422, 559, 463, 698, 428/213, 220; 156/62.8; 419/10

[56] References Cited

U.S. PATENT DOCUMENTS

| | | | |
|---|---|---|---|
| 3,743,556 | 7/1973 | Breton et al. | 156/62.8 |
| 3,864,124 | 2/1975 | Breton et al. | 428/559 |
| 3,916,506 | 11/1975 | Wolf | 428/457 |
| 4,194,040 | 3/1980 | Breton et al. | 428/422 X |

Primary Examiner—Thomas J. Herbert, Jr.
Attorney, Agent, or Firm—John G. Gilfillan; Susan A. Capello

[57] ABSTRACT

The wear resistance of hardface coatings formed on a metal substrate using cloth-like flexible preforms, by substituting two or more thinner preforms for the single layer preform heretofore employed.

9 Claims, 1 Drawing Sheet

WEAR RESISTANCE IN A HARDFACED SUBSTRATE

The present invention relates to the modification of elected physical properties of preformed metal articles, and more particularly to improved wear resistance in hardfaced metal substrates.

BACKGROUND OF THE INVENTION

It is sometimes advantageous to coat a substrate, especially a metal, with a coating having special properties, for example, wear resistance or corrosion resistance. Wear resistance can be provided for a substrate by coating it with a coating composed of a mixture of hard abrasive material such as powdered tungsten carbide or the like, dispersed in a hard filler metal. Corrosion resistance can be provided to a substrate with a similar coating composed of a corrosion resistant metal or alloy. Other special or improved physical properties can be obtained in a similar manner substituting other matrix materials.

Prior to the work of Breton et al. (U.S. Pat. Nos. 3,743,556, 3,916,506, and 4,194,040 the specifications and claims of which are incorporated herein by reference) it was difficult to produce such a coating, especially on objects having an intricate or complicated shape or requiring a coating thickness of greater than 0.020 of an inch: In the prior methods using plasma and flame spraying techniques, it was difficult to get uniform coatings on a substrate, especially a substrate having an intricate surface. A similar difficulty occurred in the prior method using techniques such as abrasive particle dusting onto the substrate.

Breton et al eliminated many of the difficulties that existed in the prior art methods by providing a method using a first layer of a desired thickness of a high melting point powdered matrix material in an organic binder material and a second layer of a lower melting temperature powdered brazing filler material also in an organic binder. The first layer is then placed on the substrate with the second layer in turn placed on top of it. The matrix material is characterized as being wetted by the brazing filler metal or alloy in the molten state. This assembly is then heated to decompose the binders and melt the filler metal or alloy which is infused by capillary action into the matrix layer. Cooling then yields an essentially void-free coating bonded on the substrate. The method for preparing both the hard particle matrix material as well as the braze filler alloy layers or preformed using fibrillated polytretra fluoroethylene (PTFE) is disclosed in U.S. Pat. Nos. 3,916,506 and 4,194,040. One of the big factors in determining ultimate physical properties by Breton et al method (wear resistance and/or corrosion resistance characteristics) of the coating is the amount of matrix particle packing. This matrix particle loading in the preform and the final coating layer is dependent in general on three material property factors: particle size, size distribution and shape. This has been found to be a limiting factor to this method. There has been a desire to try to increase this particle loading but the inherent properties of the powder material (particle size, size distribution and shape) and processing constraints have limited the success especially with articles in which the finish coating layer is in excess of 0.030 of an inch.

SUMMARY OF INVENTION

One method of increasing the desired properties (wear resistance/corrosion resistance) of coating has been to increase the solid density of the matrix layer or preform (in the case of wear resistance—the solid density of the hard particle preform). It has been found that as the thickness of the hard particle preform is reduced through rolling procedures, the hard particle loading (density) in the layer or cloth-like sheet increases. Thus, to obtain improved wear resistance for a given thickness of coating (typically 0.030 of an inch or more) multiple layers of hard particle sheets should be employed. In fact it has been found that by reducing the thickness of layers and employing two or more thin layers in place of a single layer having the same overall thickness, not only is there an increase in densification, but also a much larger increase in wear resistance results.

In accordance with one aspect of the present invention, there is provided a composite article produced by brazing a cloth-like flexible metallic coating containing matrix particles in PTFE carrier material to a surface of a metal substrate in which said metallic coating comprises a plurality of thin cloth-like flexible metallic layers.

In accordance with a more particular aspect of the present invention each of the plurality of thin cloth-like flexible metallic layers vary from 10 percent to 90 percent of the metallic coating thickness.

In accordance with yet another particular aspect of the present invention, the matrix particles are selected from the group consisting of tungsten carbide, titanium carbide, nickel boride and chromium carbide.

In accordance with another aspect of the present invention, there is provided a method for producing a composite article by brazing a cloth-like flexible metallic coating on a substrate for providing the desired surface coating of a predetermined thickness to the metallic substrate, wherein said desired metallic coating is made from a matrix powder blended with PTFE and mechanically worked to fibrillate the PTFE and trap the matrix particles in which said metallic coating is then subjected to a further rolling operation reducing the thickness to from about 25% to about 85% of the original predetermined thickness of the desired surface coating, wherein said reduced thickness coating is cut into a series of preforms having a predetermined configuration, and wherein a plurality of said preforms having a combined thickness of about the predetermined thickness of the desired surface coating are positioned on the surface of the metallic substrate and brazed to provide the composite article having desired special properties.

One benefit obtained by the present invention is to provide a composite article with greatly improved physical properties in its coating layer.

Another benefit obtained by the present invention is to provide a composite article with a thick coating layer having greatly improved wear resistance properties.

It is an object of this invention to provide an improved coating.

It is another object of the present invention to provide a hard facing coating having improved wear resistance.

It is yet another object of the present invention to provide an improved article and method comprising a substrate having a plurality of matrix particle containing surface layers brazed thereto.

Further features and advantages of the invention will readily be apparent from the specification and from the drawings.

DETAILED DESCRIPTION OF THE INVENTION

Figure 1:
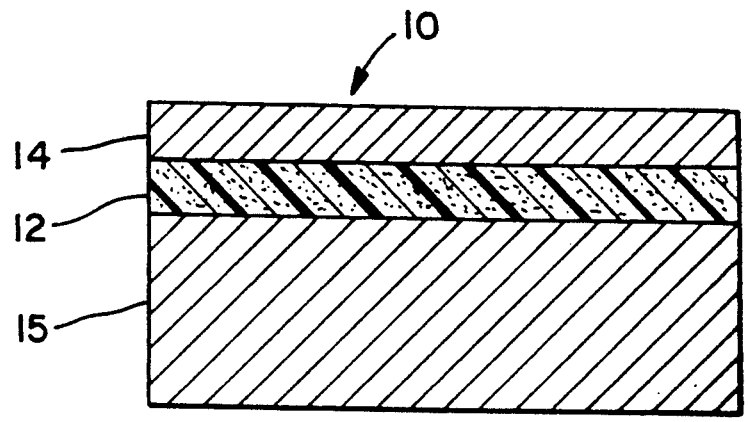
FIG. 1 illustrates a composite article made according to the prior art.

Referring now to the drawing wherein the showings are for purposes of illustrating the prior art and preferred embodiments of the invention only and not for the purpose of limiting same. FIG. 1 shows a composite article 10 of the prior art in which a matrix metal layer 12 and a braze filler metal layer 14 are heated as fully described in U.S. Pat. No. 3,743,556 to provide a desired surface coating (not shown) on a substrate 15. Briefly, the coating is achieved on the substrate surface by first laying a matrix particle layer or preform (matrix powder material in fibrillated PTFE) on the substrate and then a braze filler alloy layer or preform (braze filler material in fibrillated PTFE) is applied on top of the matrix particle preform. The weight and thickness of this braze preform is matched to the relative density of the matrix preform to yield a fully dense layer or coating of the same general thickness as that of the original matrix metal layer. An adhesive can be used, if desired, to initially hold this assembly together. Brazing is done in a controlled atmosphere or in a vacuum at a temperature above the liquidus temperature of the braze filler but below that of matrix particle. At such temperature molten braze infiltrates through the matrix particle preform and fills the voids and subsequently bonds to the substrate by diffusion effect yielding a coating layer essentially the same thickness as initial matrix metal layer.

Figure 2:
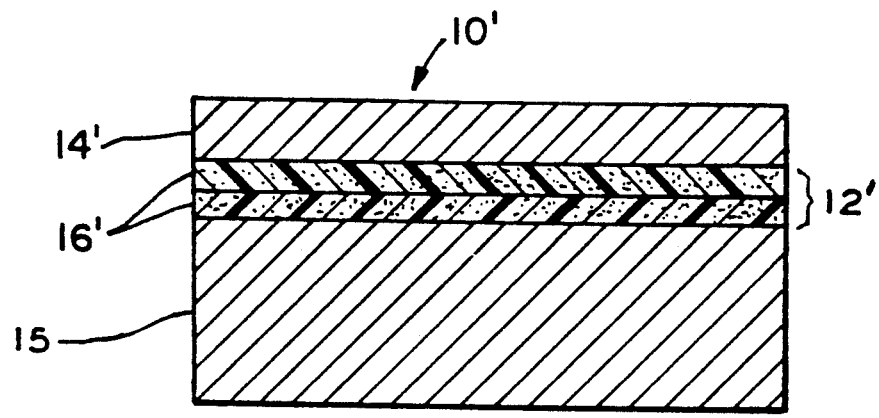
FIG. 2 illustrates a composite article made according to the present invention.

FIG. 2 shows a composite article 10' of the present invention in which the total matrix powder metal layer 12' is comprised of two or more sheets or preforms 16'. The sheets 16' are typically made of hard particle material such as tungsten carbide, titanium carbide, nickel boride, chromium carbide or the like entrapped in an organic binder of fibrillated PTFE. The two or more sheets 16' for ease of manufacturing generally are of equal thickness in total equaling the thickness of layer 12' and ultimately the final coating thickness. Although in special applications, the individual sheets could vary from 10% to 90% of the overall final coating thickness. That is, sheets of different thickness can readily be used having a total thickness equal to that of final desired coating layer.

In accordance with this invention, the sheets 16' which make up layer 12' are reduced in thickness typically from about 25% to about 85% from that of layer 12 (see FIG. 1) thus increasing solids density typically 10% or more. This 10% increase in solids density has produced increase desired properties (wear resistance) as high as 50% or more.

The present invention is described in greater detail with reference to the following examples contrasting the prior art and preferred practices of the invention.

EXAMPLE I

Tungsten carbide powder (40% by volume 2 to 5 micron size particles and 60% by volume −325 mesh size particles) was mixed with 6% by volume Teflon (PTFE). This mixture was mechanically worked to fibrillate the PTFE and trap the tungsten carbide particles, thus making a cloth-like sheet, as fully described in U.S. Pat. Nos. 3,864,124 and 4,194,040. The sheet was rolled to 0.060 of an inch thickness with a solids density of approximately 52% by volume.

A braze alloy powder with the composition of 81.5% nickel, 15% chromium and 3.5% boron by volume was mixed with 6% by volume of PTFE to form a cloth-like sheet similar to that of tungsten carbide sheet set forth above with a weight density and thickness matched so as to fill voids in tungsten carbide sheet. The test sample to be hardfaced was a low carbon steel (3"×1"×0.250"). Sheets of the carbide and the braze material were cut into the 3"×1" size preform for bonding to the substrate surface. The carbide preform was placed on top of the substrate surface and the braze preform was placed on top of the carbide preform as illustrated in FIG. 1. The preforms were temporarily held together by means of adhesive. The assembled test sample was heated in a vacuum furnace to 2085° F. for 30 minutes. The braze material melted and infiltrated the carbide preform and upon cooling the article provided a tungsten carbide coating of approximately 0.060 of an inch on the steel substrate as in U.S. Pat. No. 3,743,566. The coating surface was ground with a diamond wheel to allow for accurate measurement of wear resistance as per ASTM standard 665 Procedure 'A' test method. The test showed wear loss of the coating measured at 0.0088 cc. This was calculated to an Abrasion Resistance Factor (ARF) of 113.

EXAMPLE II

The tungsten carbide sheet referred to in Example I of a thickness of 0.060" was further reduced to 0.030" by following a series of decrement rolling steps. The solids density of the sheet was found to have risen from 52% to 60%. Two preforms in the size of 3"×1" were cut from carbide sheet. These carbide preforms were applied on the steel substrate one on top of another. The braze alloy preform of Example I was then applied on the top of carbide to provide the composite shown in FIG. 2. The brazing conditions were the same as described in Example I. Finally, the coated test sample was abrasive wear tested in the same manner as the sample of Example I. The volume loss on the coating was measured at 0.0061 cc. The resulting ARF value was 163.

EXAMPLE III

A test similar to that described in Example II was produced using three equal layers 0.020 of an inch thickness, to make up the 0.060 tungsten carbide layer thickness. The solids density of the sheet was 67%. This coated sample was abrasive wear tested by same test procedure as Examples I and II. The volume loss on the coating was measured to 00518 cc. The resulting ARF value was 193.

Thus, comparing the results on the tests on the coatings made with prior art method, Example I, and the method of the present invention, Example II and III, shows that while the method of the present invention provided an increase in the solids density of the carbide preform of only 8% and 15% respectively, the wear resistance value increased 44% and 71% respectively. This fact allows for greatly enhanced productive life of the product.

The novel method of the present invention relates to a process for providing a desired matrix surface coating to a metallic substrate wherein a matrix powder is blended with PTFE and mechanically worked to fibrillate the PTFE and trap the matrix surface particles to provide a plurality of cloth-like sheets to form a predetermined thickness layer greater than about 0.030 and more particularly to the improvement wherein said cloth-like sheet is subjected to a series of decremental rolling steps in which its thickness is reduced from about 25% to about 85% of predetermined thickness layer, and wherein the said sheet is then cut into a series of preforms having a predetermined configuration and wherein at least two of said preforms are positioned on the surface of a article substrate and brazed to provide a hard surface composite article having improved physical properties such as wear resistance.

In addition to the layers of preform employed to provide a hardface surface coating, a further preform between the hardface surface layer and the substrate surface may be employed as taught in corresponding application Ser. No. 07/749,975 filed on Aug. 26, 1991.

Again, while the individual sheets may be from 10% to 90% of the thickness of the coating or preforms heretofore employed, the more preferred thickness for the sheets is in a range of plus or minus 10% of being equal, and the most preferred embodiment is one employing preforms having approximately equal thickness. It will, of course, be obvious that in lieu of employing two or more preforms which provide approximately the same thickness as the single preform heretofore employed, it is also possible to employ a 2 or more still thinner preforms which would provide a composite hard surface thinner than that heretofore employed but having the same degree of wear resistance as that provided by the thicker single layer hardface preform heretofore employed.

While the articles in the drawings have been illustrated as having a bar shape, they may also as noted by round shaped or they may have square, oval, elongated or any other suitable shape especially those having a non-linear configuration.

The patents, patent application and foreign patent publications set forth in the specification are intended to be incorporated by reference herein.

It is apparent that there has been provided in accordance with this invention a process and product which fully satisfy the objects, means and advantages set forth hereinbefore. While the invention has been described in combination with the specific embodiments thereof, it is evidence that many alternatives, modifications, and variations will be apparent to those skilled in the art in light of the foregoing description. Accordingly, it is intended to embrace all such alternatives, modifications and variations as fall within the spirit and scope of the appended claims.

We claim:

1. An improved composite article having a metal substrate and a metallic coating of a selected thickness brazed thereto, the metallic coating being produced by brazing to the substrate a single cloth-like layer of matrix particles in a fibrillated binder, the layer having the selected thickness; wherein the improvement comprises:
a plurality of stacked cloth-like layers of matrix particles in a fibrillated binder, the stacked layers replacing the single cloth-like layer, the total thickness of the stacked layers being equal to the selected thickness, each stacked layer having its initial thickness decreased to increase the density of matrix particles therein.

2. The composite article of claim 1 wherein said matrix particles are selected from the group consisting of tungsten carbide, titanium carbide, nickel boride and chromium carbide.

3. The composite article of claim 1 wherein stacked cloth-like layers vary from 10% to 90% of the selected thickness.

4. The composite article of claim 1 wherein said stacked cloth-like layers are of the same general thickness.

5. The composite article of claim 1 wherein the initial thickness of said plurality of think cloth-like layers is reduced from about 20% to about 85% of said selected thickness.

6. The composite article of claim 1, wherein: the density of the matrix particles in the stacked layers is increased by about at least 8%.

7. The composite article of claim 1, wherein: the wear resistance of the metal coating is increased by about 44% due to the increase in density of the matrix articles and the stack layers.

8. The composite article of claim 1 wherein the density of matrix particles in the stacked layers is increased by about 8% to about 15% and as a consequence the wear resistance of the metallic coating is increased by about 44% to about 71%.

9. The composite article of claim 1 wherein the initial thickness of the stacked layers is decreased by rolling thereof.

* * * * *